(12) United States Patent
Kobayashi (10) Patent No.: US 7,518,859 B2
(45) Date of Patent: Apr. 14, 2009

(54) HARD-DISK-DRIVE-CASE

(75) Inventor: Toshihiro Kobayashi, Tokyo (JP)

(73) Assignee: Grow Up Japan, Inc., Tokyo (JP)

( * ) Notice: Subject to any disclaimer, the term of this patent is extended or adjusted under 35 U.S.C. 154(b) by 137 days.

(21) Appl. No.: 11/756,757

(22) Filed: Jun. 1, 2007

(65) Prior Publication Data

US 2007/0294777 A1 Dec. 20, 2007

(30) Foreign Application Priority Data

Jun. 1, 2006 (JP) ............................. 2006-153688

(51) Int. Cl.
*H05K 5/00* (2006.01)
*H05K 5/06* (2006.01)
*H05K 7/00* (2006.01)
*H05K 7/20* (2006.01)
*H01G 9/10* (2006.01)
*G06F 1/16* (2006.01)
*G06F 1/20* (2006.01)

(52) U.S. Cl. ........................ 361/685; 361/518; 361/536; 361/684; 361/687

(58) Field of Classification Search ................. 361/518, 361/536, 684, 685, 687
See application file for complete search history.

(56) References Cited

U.S. PATENT DOCUMENTS

| | | | | |
|---|---|---|---|---|
| 6,005,768 | A * | 12/1999 | Jo | 361/685 |
| 7,245,491 | B2 * | 7/2007 | Throckmorton et al. | 361/695 |
| 2001/0006453 | A1 * | 7/2001 | Glorioso et al. | 361/685 |
| 2002/0093788 | A1 * | 7/2002 | Rothschild | 361/685 |
| 2006/0232891 | A1 * | 10/2006 | Bushnik et al. | 360/265.6 |

* cited by examiner

*Primary Examiner*—Jayprakash N Gandhi
*Assistant Examiner*—Anthony M Haughton
(74) *Attorney, Agent, or Firm*—Lowe Hauptman Ham & Berner, LLP (57) ABSTRACT

An HDD case is provided that enables direct connection of an interface connector and houses an HDD and that is superior in regard to vibration absorption, sound insulation, radiating heat, and waterproofness, and that consists of (1) a rectangular box-like case body, (2) a cover that have a heat sink, mounted via an adhesive synthetic-resin mat, and sound-absorbing materials; (3) a relay board that includes an internal connector fitted with an interface connector of the HDD, an external connector exposed to the outside so as not to protrude beyond the outside surface of the cover when the cover is closed, and wiring that connects the connectors; and (4) a waterproof seal that is applied all along the mating surface between the cover and the opening at the top of the case body and between the cover and the upper opening surface of the external connector.

5 Claims, 4 Drawing Sheets

HARD-DISK-DRIVE-CASE

BACKGROUND OF THE INVENTION

1. Field of the Invention

The present invention relates to the structure of a hard-disk-drive (hereinafter "HDD") case (hereinafter "HDD case") used for storing and protecting a hard-disk drive, and more particularly relates to an HDD case that provides electricity and a direct connection for a signal connector and that is superior in regard to vibration absorption, sound insulation, heat radiation, airtightness, and waterproofing.

2. Description of the Related Art

An HDD is generally provided with a drive part that rotates at high speed, and therefore an HDD requires measures against the heat and vibration associated with high-speed rotation.

Accordingly, it is advantageous for the HDD case to be airtight by using soundproofing materials (or sound-absorbing materials) so as to prevent the sounds caused by the rotation or vibration of the drive from escaping from the case.

Also, the airtightness of an HDD case is emphasized because the HDD must be protected from dust due to the precise conditions required for the drive mechanism.

However, providing airtightness for a case generally causes concerns about performance stability and so on of the HDD, because airtightness hinders the natural convection of air and heat, with the result that heat is trapped in a case that does not allow the HDD to dissipate heat thoroughly.

The inventor-applicant of the present invention has proposed a HDD-case structure that is superior in regard to vibration absorption, sound insulation, and heat radiation, and that therefore deals with the above-mentioned problems (for example, refer to Patent Document 1).

The HDD case 50 of Patent Document 1 is a case made from a metal such as an aluminum alloy, with the case's inner surface being covered by a mat made from Sorbothane (a brand-name material that is high in thermal conductivity and vibration-absorption capability), a sponge-like sound-absorbing material, a heat sink, or the like.

The procedure for housing an HDD in such an HDD case is as follows:

First, the case body's cover is disassembled by loosening the screws that fasten the cover to the case body.

Next, the HDD is fitted inside the case body where the sound-absorbing materials and the heat sinks that are on Sorbothane mats are mounted on the inner surfaces of both the HDD's cover and the HDD case;

Then, a feeder cable and a signal cable that are interface cables are mounted on the connector of the HDD and are pulled out through an opening in a wall of the case.

Last, the cover is attached.

As described above, the HDD case according to Patent Document 1, like a conventional HDD case, also requires interface cables (a feeder cable and a signal cable) and therefore cable connections are indispensable because the HDD's connector is located inside the HDD case.

Accordingly, when a feeding connector and a signal connector are provided on the backplane (i.e., motherboard) so as to configure a disk array (RAID), it is not possible to utilize a connector-to-connector connection that directly connects connectors with each other without using cables.

The inventor-applicant of the present invention has recently proposed an HDD case that can accommodate a connector-to-connector connection, and that therefore eliminates the above-mentioned problems (for example, Patent Document 2).

Patent Document 1: Japanese Unexamined Patent Application Publication No. 2005-285154

Patent Document 2: Japanese Utility Model Registration No. 3119362

However, even in the HDD cases of Patent Documents 1 and 2, the seal between the case body and the HDD cover and the like is not sufficient, and waterproofness is not taken into consideration. Therefore, those HDD cases have such weaknesses as the HDD being damaged by the intrusion of moisture into the case body by, for example, water sprayed in firefighting.

In order to solve the above-mentioned problems, the present invention intends to provide an HDD case that allows direct connection of an interface connector, maintains airtightness, absorbs rattling noises, effectively radiates heat, and is superior in waterproofness.

SUMMARY OF THE INVENTION

In order to achieve the above-mentioned purposes, in a first aspect of the present invention a hard-disk-drive case (hereinafter "HDD case") provides a rectangular box-like metal case that houses a hard-disk drive (hereinafter "HDD") with said HDD case comprising:
   a rectangular box-like case body having a bottom and an open top, comprising,
      a heat sink at the center of the inner surface of the bottom, being mounted via an adhesive synthetic-resin mat, and
      sound-absorbing materials on the inner surfaces of the case's walls so as to surround said heat sink;
   a cover that fits the open top of said case body, comprising,
      a heat sink at the center of the inner surface of said cover being mounted via an adhesive synthetic-resin mat, and
      sound-absorbing materials that surround said heat sink of said cover;
   a relay board on the inside of the front wall of said case body, comprising,
      an internal connector that fits an interface connector on the housed HDD,
      a relay-board external connector that is exposed at an open top of the front of said case body and that faces the outside, and that is positioned such that the top surface of said connector will not protrude beyond the outside surface of the cover when said cover is closed, and
      wiring pattern that connects said external connector with said internal connector; and
   a waterproof seal that is applied along the entirety of the mating surface between said cover and the open top of the case body, and between said cover and the upper opening of said external connector.

A second aspect of the present invention, an HDD case according to the first aspect of the invention, wherein
   there are provided at the forward end of said cover and at the upper end of the front of said case body openings that can accommodate said relay-board external connector and that form the edge of the upper-front end of the HDD case;
   the front of said external connector is at the same level as the edge of the upper-front end of the HDD case;
   the upper opening of said external connector protrudes from the open top of the front wall of said case body but does not extend outwardly beyond the middle of the thickness of the cover and thus does not protrude beyond the outside surface of the cover when the cover is closed; and said seal is applied all along the mating surface between said cover and the opening at the top of the case body and between said cover and the upper end of said external connector.

A third aspect of the present invention, an HDD case according to the first aspect of the invention, wherein said adhesive synthetic-resin mat is high in regard to both thermal conductivity and cushioning characteristics and is interposed between the bottom of said case body and said heat sink and between the cover and said heat sink on the cover, and both of said heat sinks contact said hard-disk drive.

A fourth aspect of the present invention, an HDD case according to the first aspect of the invention, wherein the inside dimensions of said case body are such that said case body can house HDDs of different sizes.

A fifth aspect of the present invention, an HDD case according to the first aspect of the invention, wherein to achieve waterproofness a liquid calking compound, sealing material, or hot-melt adhesive that hardens after application is applied so as to completely seal (1) the spaces at the four corners where the sides of said case body meet, (2) the circumference of the housing of said external connector at the side of said case body, and (3) the screws that are externally mounted to said case body.

According to the first aspect of the present invention, rattling noises are absorbed and blocked by the sound-absorbing materials, adhesive synthetic-resin mats, and heat sinks mounted on the inner surfaces of the cover and the case body, greatly decreasing the escape of such noises from the HDD case. Also, the heat sinks and the like are arranged on adhesive synthetic-resin mats that are made of materials that have high thermal conductivity, and heat sinks and the like are mounted on the inner surfaces of the cover and the case body. Thus, the HDD radiates heat well.

Moreover, the waterproof seal that is applied all along the mating surface between the cover and the case body prevents the HDD from being damaged by the intrusion of moisture into the case body by, for example, water sprayed in firefighting.

Further, a relay board on the inside of one side of the case body is provided with a relay-board external connector as an interface connector that allows connector-to-connector connection with a controller device.

Furthermore, the spaces around the relay-board external connector can be sealed, which ensures sound insulation and waterproofness.

In addition, this constitution has such advantages as being able to employ either a cable connection with a controller device or a connector-to-connector connection with a controller device.

The second aspect of the present invention provides the same advantages as that of the first aspect of the present invention. In addition, openings are provided on the case body and the cover, and the upper opening surface of the relay-board external connector is mounted at the intersection of said openings, protruding from the opening at the top of the front of said case body, which allows the relay-board external connection to be configured visually diagonally from the backside of the HDD case and to easily fit with another connector to be connected to it.

Moreover, the edge pins of the relay-board external connector can be seen from outside through the openings on the cover. Therefore, when connecting another connector to the relay-board external connector, inserting the relay-board internal connector backwards and at the back side of the case body can be prevented, and the edge pins can be cleaned more easily.

Furthermore, a waterproof seal is applied all along the mating surface between the cover and the open top of the case body, and between the cover and the upper opening of the external connector, which further increases the case's waterproofness and facilitates mounting or removal of the cover to or from the case body without any danger that the cover will fall off of the case body.

The third aspect of the present invention provides the same advantages as that of the first aspect of the present invention. In addition, there is formed a heat-transfer path from the HDD to the bottom of the case body and the cover, through the heat sink and adhesive synthetic-resin mats that contact the HDD, allowing the HDD in the case to radiate heat from all of its surfaces, which further increases heat radiation.

The fourth aspect of the present invention provides the same advantages as that of the first aspect of the present invention. In addition, the inside dimensions of the case body are such that said case body can house HDDs of different sizes, which allows an HDD case that houses a 2.5-inch or 3.5-inch HDD to be mounted on a multiple-HDD storage device that accommodates trays allowing each HDD to be removed, which increases the convenience of the HDD case.

Furthermore, the storage-device tray can be changed to one that is superior in regard to sound isolation, heat radiation, and waterproofness.

The fifth aspect of the present invention provides the same advantages as that of the first aspect of the present invention. In addition, in order that the HDD case will be completely waterproof, a liquid calking compound, sealing material, or a hot-melt adhesive that hardens after application is applied so as to completely seal (1) the spaces at the four corners where the sides of the case body meet, (2) the circumference of the housing of the external connector at the front of said case body, and (3) the screws that are externally mounted to the case body.

EXPLANATIONS OF REFERENCE NUMBERS

1 Relay board
2 Male connector
3 Female connector
4 Spacer
5a and 5b Adhesive synthetic-resin mat
6 Metal support
6a Long hole
7 Opening o the cover
8 Opening on the front wall 9 Edge pin
10 Tapped hole
11 First port
12 Second port
13 Third port
50 Case
51 Cover
51a Case-body mating surface
51b Male-connector mating surface
52 Case body
52a Front wall
52b Back wall
52c Right- and left-side walls
52d Flange
52e Bottom
52f Fin
52g Case base
53a, 53b Sound-absorbing material
54a, 54b Heat sink
55 Feeder cable
56 Signal cable
57 Seal
57a Case-body sealant
57b Male-connector sealant
60 Hard-disk drive (HDD)
100 Hard-disk-drive case (HDD case)
d Depth of opening on front wall
h Height of male connector
t Thickness (of cover and side walls of the case body)
t1 Thickness of male-connector mating surface
t2 Thickness of seal
s1-s7 First-port signal line
p1-p15 Third-port feeder line

DESCRIPTION OF THE PREFERRED EMBODIMENTS

The present invention will now be described specifically according to the following illustrated embodiments of the invention.

Embodiment 1

Figure 1:
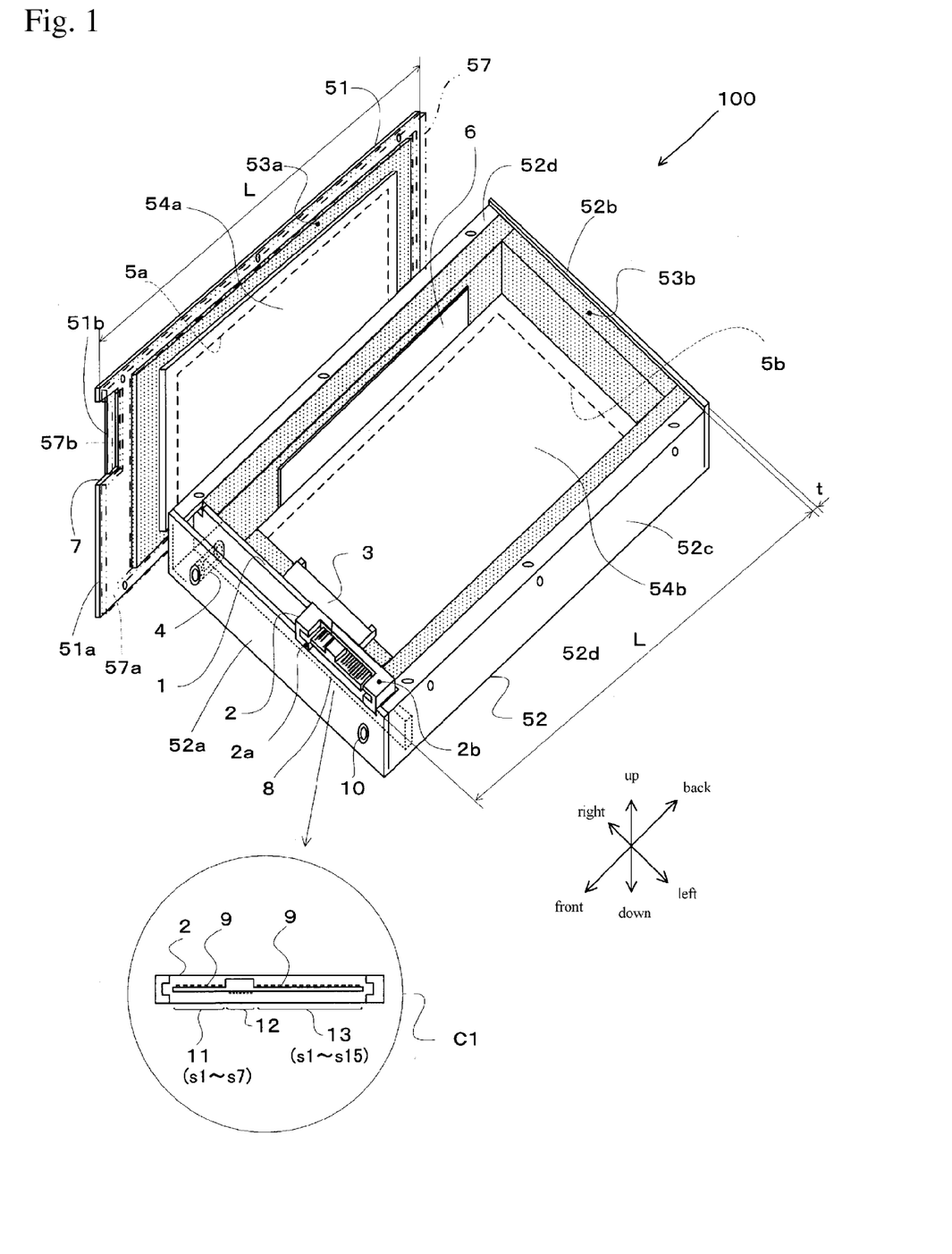
FIG. 1 is a perspective view of the hard-disk-drive case of Embodiment 1 of the present invention with the case's cover removed.
Figure 2:
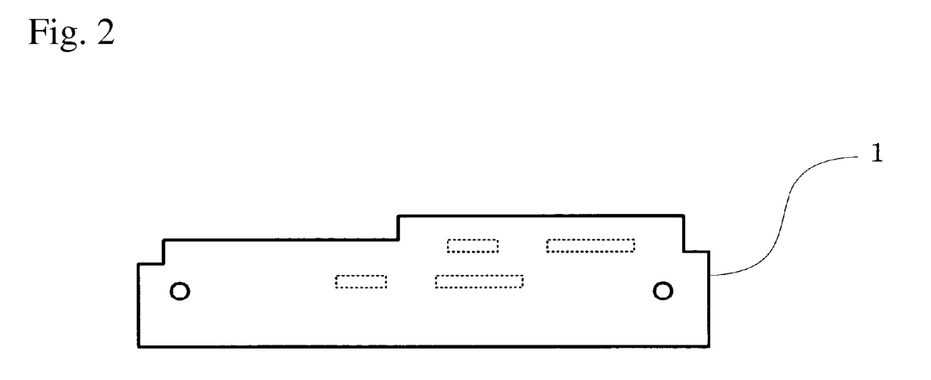
FIG. 2 is an elevation view of the relay board of FIG. 1.
Figure 3:
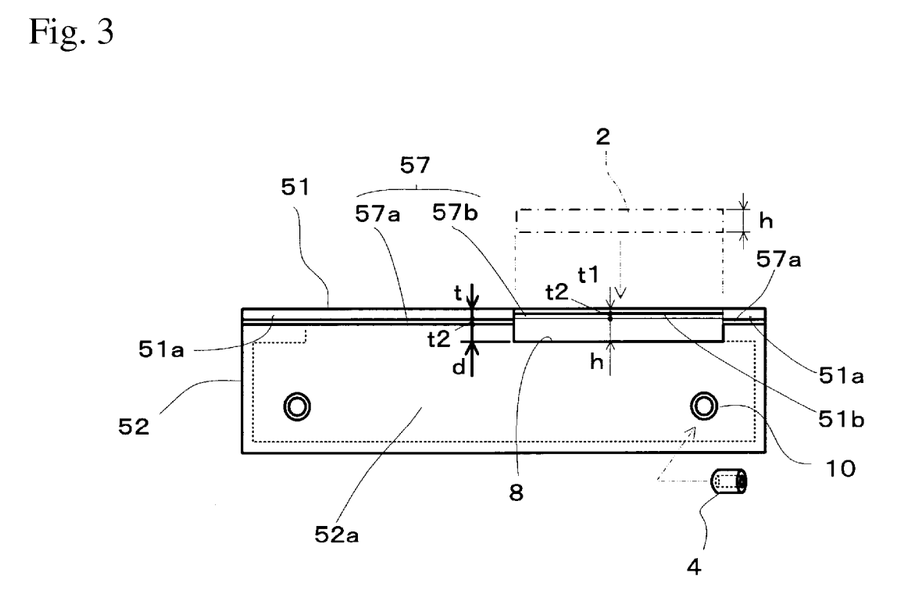
FIG. 3 is an elevation view of the hard-disk-drive case of Embodiment 1 (FIG. 1).
Figure 4:
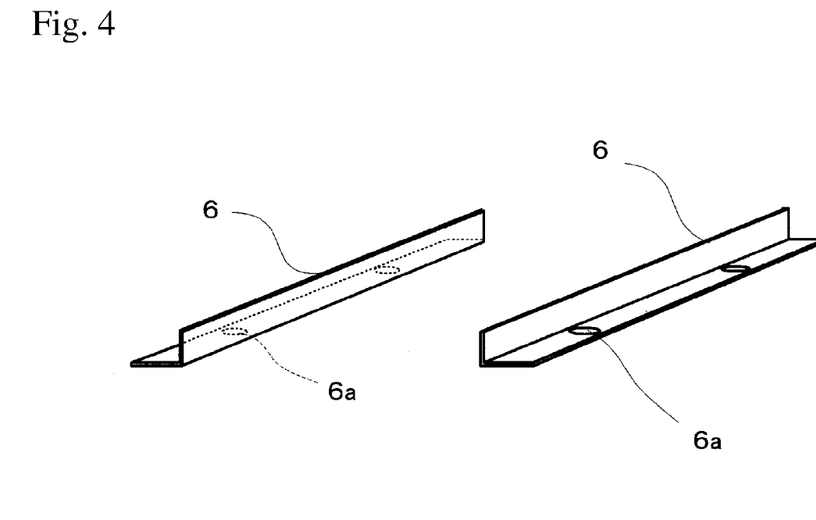
FIG. 4 is a perspective view of the metal support of FIG. 1.
Figure 5:
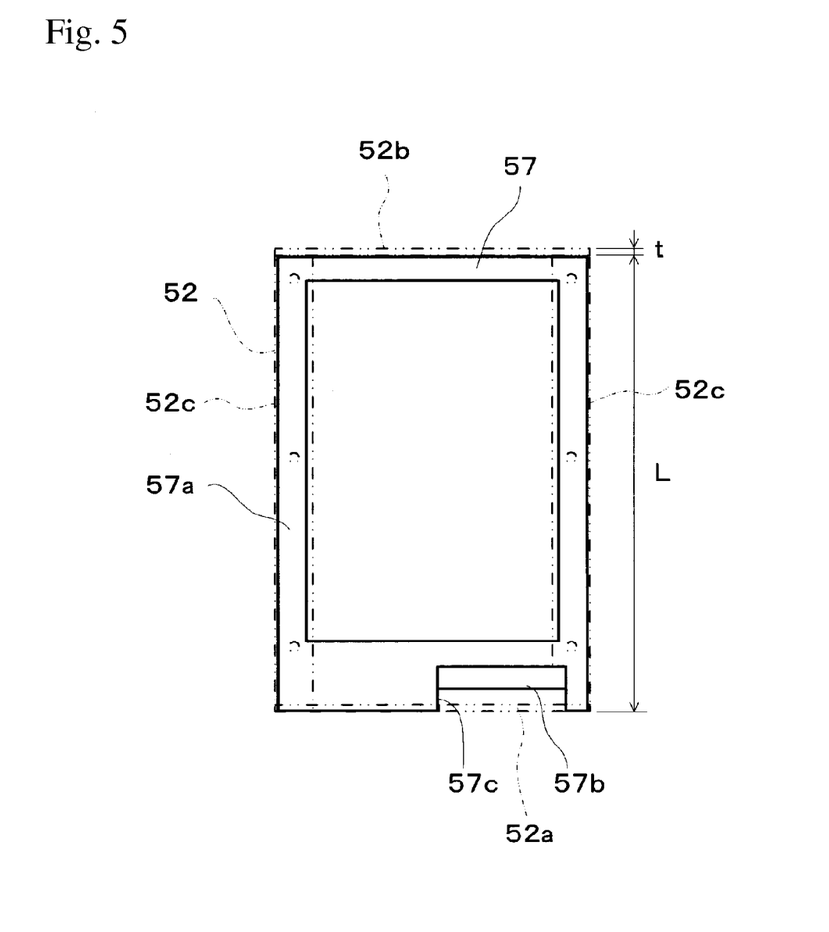
FIG. 5 is a plan view of the seal seen from the side of the cover to which the member is applied.
Figure 6:
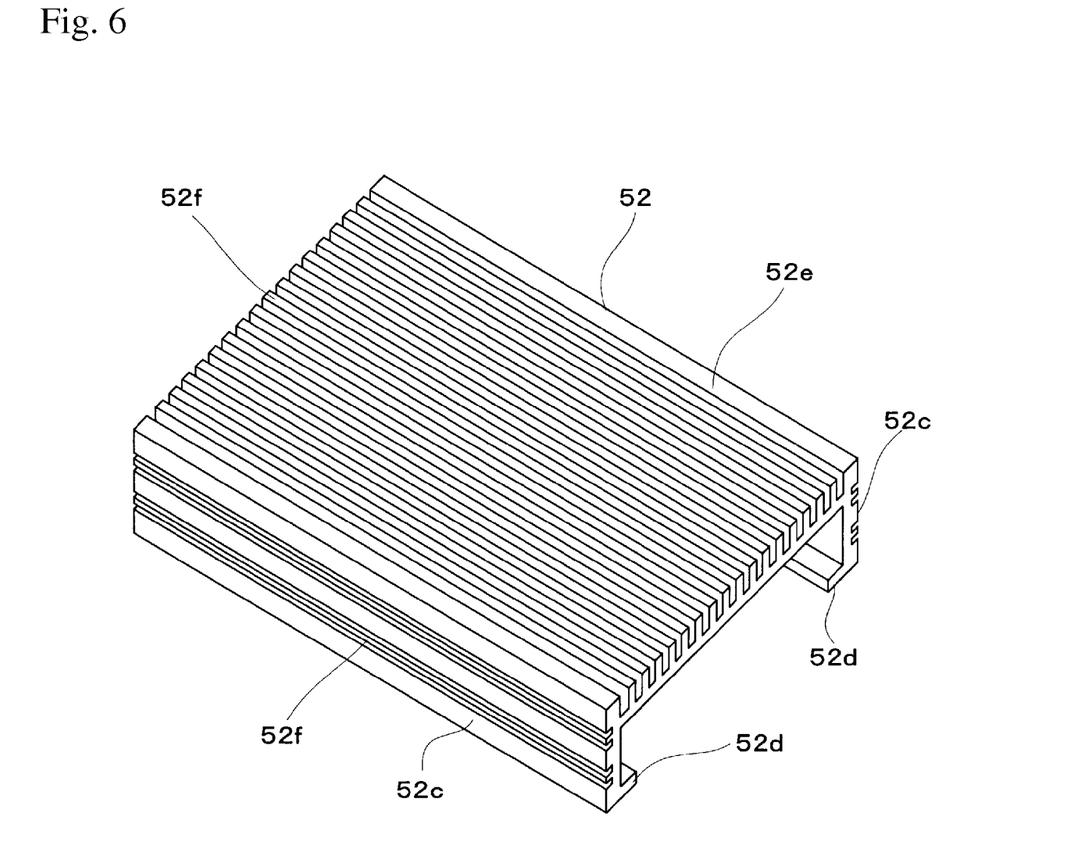
FIG. 6 is a perspective view of the case base seen from the bottom of the case body of Embodiment 2 of the present invention (the front and back walls are not shown).

FIG. 1 is a perspective view showing the HDD case of Embodiment 1 of the present invention with the cover removed.
FIG. 2 is an elevation view of the relay board of FIG. 1.
FIG. 3 is an elevation view of the HDD case of Embodiment 1.
FIG. 4 is a perspective view of the metal support of FIG. 1.
FIG. 5 is a plan view of the seal seen from the side of the cover to which the member is applied.
FIG. 6 is a perspective view of the case base seen from the bottom of the case body of Embodiment 2 of the present invention (the front and back walls are not shown).

The HDD case 100 of Embodiment 1 has a thin, rectangular box-like shape and is composed of (1) a case body 52 that has a bottom and an open top, and (2) a thin sheet-metal cover 51 that has, for example, a thickness t of approximately 2 mm, and that is made from an Al-alloy-type metal or copper-alloy-type metal, both of which are light in weight and have high thermal conductivity.

The case body 52 of this embodiment, by having all four sides 52a, 52b, 52c, and 52c stand vertically from its bottom, has a rectangular box-like shape. Furthermore, the flanges 52d, to which the cover 51 above the wall 52c is attached by screws, are of appropriate width and are bent inward horizontally. The upper-end surfaces of the three walls 52a, 52c, and 52c, on the front, left, and right, respectively, and the top surface of the flange 52d, are formed at the same level so as to constitute a surface for attaching the cover thereon.

Also, the upper-end surface of the back side 52b protrudes beyond the upper surface of the other walls of 52a, 52c and 52c, and the flange 52d, so as to be generally flush with the outside surface (the top surface) of the cover 51 when the cover 51 is closed. This protrusion functions as a positional guide for setting the rear end of the cover 51 when the cover 51 is being closed.

Accordingly, the cover 51 has a length L in its front-to-back direction, which length is obtained by subtracting the thickness t of the back wall 52b of the case body 52 from the total length of the case body 52.

Three tapped holes for counter sunk screws are provided at the middle and two ends of both sides of the cover, and the cover 51 is attached by screws to the top surface of the right and left flanges 52d of the case body 52, each of which is provided with three holes corresponding to the three holes on each side of the cover 51.

A rectangular adhesive synthetic-resin mat 5b that is made of a material that is high in thermal conductivity and cushioning capability, for example, Sorbothane (brand name), is applied on the center part of the inside of the bottom of the case body 52, in the area within the dotted lines shown in FIG. 1, and a rectangular heat sink 54b, which is slightly larger than the adhesive synthetic-resin mat 5b and whose size corresponds to that of the HDD to be housed, is placed on the adhesive synthetic-resin mat 5b.

Because the adhesive synthetic-resin mat 5b is sticky, the heat sink 54b can be held there just by being placed on that mat.

Furthermore, the sound-absorbing material 53b, which is made from a sponge-like soft synthetic resin, natural rubber, or the like, is placed along the inner surfaces of the walls 52a, 52b, and 52c so as to surround the inside heat sink 54b.

The top surface of the sound-absorbing material 53b that is mounted along the inner surface of the walls 52a, 52b, and 52c is formed at least at the same level with or slightly protruding beyond the top surfaces of the three right, left, and front walls, 52a, 52c, and 52c, respectively, and the flanges 52d, so as to make a surface suitable for attaching the cover thereon.

If the top surface of the sound-absorbing material 53b slightly protrudes beyond the top surfaces of the walls 52a, 52c, and 52c and the flanges 52d, the airtightness of the mating surface with the cover 51 is increased, because the sound-absorbing material 53b is compressed to adhere closely to the inner surface of the cover 51 when the cover 51 is closed.

Likewise, a heat sink 54a, which is slightly larger than the adhesive synthetic-resin mat 5b and whose size corresponds to that of the HDD to be housed is placed on the center part of the back side (the inner surface) of the cover 51 through a rectangular adhesive synthetic-resin mat 5a made from Sorbothane or the like, and an sound-absorbing material 53a made from a sponge-like soft synthetic resin, natural rubber, or the like is mounted surrounding the heat sink 54a, excluding the mating surface at the opening at the top of the case body 52.

Moreover, a waterproof seal 57 is applied all along the surface of the back side (the inner surface) of the cover 51 that mates with the open top of the case body 52 (including the upper-end surfaces of the walls 52a, 52c, and 52c, the top surface of the flanges 52d, and the upper-end surface of the sound-absorbing material 53b).

The shapes and other characteristics of the cover 51 and the seal 57 will be described below.

The rectangular adhesive synthetic-resin mats 5a and 5b are slightly smaller than their corresponding respective heat sinks 54a and 54b. This makes it easier to correctly place the respective sound-absorbing materials 53a and 53b around the heat sink 54a and 54b.

As shown in FIG. 1 and FIG. 4, the metal supports 6, which have an L-type cross-sectional shape, are mounted by screws (not shown) at the right and left sides of the heat sink 54b above the inside bottom of the case body 52.

Both the right and left metal supports 6 are provided with, for example, two pierced long holes 6a so as to adjust the crosswise-direction width fit to that of the HDD being housed.

The sound-absorbing material 53b is held between the inner surfaces of the right and left walls 52c of the case body 52 and metal supports 6.

The cover 51, the case body 52, the heat sinks 54a and 54b, and the metal supports 6 are all made from, for example, a lightweight aluminum alloy that has high thermal conductivity. This allows the housed HDD to radiate heat via the heat sinks 54a and 54b, the metal supports 6, and the cover 51, which results in good thermal conductivity. Moreover, the outer surfaces of the cover 51 and the case body 52 are treated with black alumite, which increases their heat radiation.

This constitution allows rattling noises to be absorbed and blocked by the sound-absorbing materials 53a and 53b that are mounted on the inner surfaces of the cover 51 and the case body 52, respectively, by the adhesive synthetic-resin mats 5a and 5b, and by the heat sinks 54a and 54b, greatly decreasing the escape of rattling noises from the HDD case 100. Furthermore, the cover 51, the case body 52, and the metal supports 6 are made from an aluminum alloy that has high thermal conductivity, and the heat sinks 54a and 54b that contact the adhesive synthetic-resin mats 5a and 5b are structured so as to contact above and below the surfaces of the HDD, which further radiates heat from all the surfaces of the HDD.

A relay board 1 is provided on the inner surface of the front of the case body 52 near the front wall 52a. The relay board 1 is mounted on the other side of the spacers 4 by screws, the spacers 4 being fastened by counter sunk screws in, for example, two holes provided in the front wall 52a.

A female connector 3 (an internal connector) to fit with an interface connector of the HDD is provided at one side (inside the case body 52 in which the HDD is housed) of the relay board 1, being positioned opposite to the HDD.

At the other side (the side of the front wall 52a) of the relay board 1, a male connector 2 (external connector) is positioned at the front, facing the outside.

The holes of the female connector 3 and the pins of the male connector 2 are connected according to wiring not shown mounted on the relay board 1.

A 2.5-inch or 3.5-inch hard disk typically has a rectangular box-like shape, with the upper side of the HDD being the flat surface of an aluminum case in which a disk drive is housed, and with an uncovered control board on the bottom surface of the HDD.

Moreover, an interface connector is provided at the end of the control board.

When housing such a HDD into the HDD case 100, the HDD is positioned so as to allow the flat top surface of the HDD to be in contact with the heat sink 54 at the bottom of the HDD case 100. This causes the female connector 3 to rise upward to the midpoint of the relay board 1.

Meanwhile, there is a gap between the control board of the HDD and the heat sink 54a of the cover 51 without close-contact therebetween.

A HDD can have an ATA-interface specification or a SCSI-interface specification.

There are two methods for transferring date between computer-related devices: serial ATA (hereinafter "SATA") and serial SCSI (hereinafter "SAS"). The serial transfer method has a high speed of 1.9 Gpps (approximately 190 MB/s). Recently, data transfers using a serial 1-bit transfer method have become more popular than the 8-bit or 16-bit parallel-transfer methods.

The shape of the interface connector used for a HDD is the same for both SATA and SAS.

The male connector 2 of the relay board 1 is the same as the interface connector used in SATA or SAS devices.

A male connector 2 is provided with each of the first port 11, the second port 12, and the third port 13, from right to left, as shown in the enlarged elevation view of the male connector in the separate circle C1 of FIG. 1.

Each port is positioned on a miniboard, with a 7-pin connector for the first port 11 and the second port 12, and a 15-pin edge pin for the third port 13, said connectors being provided on the front side, back side, and front side, respectively.

Also, the second port 12 is provided with a key portion that protrudes upward, which prevents a female connector from being inserted in the direction opposite to the first port 11 and the third port 13.

For example, in SATA devices, assuming that the signal lines of the first port 11 are s1 to s7, they consist of s1, s4, and s7 for the ground wires, s2 and s3 (corresponding to A+ and A−) for the input lines to the disk, and s5 and s6 (corresponding to B+ and B−) for the output lines from the disk.

Furthermore, assuming that the feeder lines are p1 to p15, they consist of p4, p12, p5, p6, and p10 for the ground wires, p3 for the 3.3-V precharge power line, p1 and p2 for the 3.3-V power lines, p7 for the 5-V precharge power line, p8 and p9 for the 5-V power lines, p13 for the 12-V precharge power line, p14 and p15 for the 12-V power lines, and p11 for the spare line.

In a conventional parallel interface, the connectors used for the power cable and the signal cable are different, while in this constitution those connectors are integrated into one interface connector.

In addition, the second port 12 is assigned individual signal lines.

In FIG. 2, dashed lines show the vertical midpoint of the relay board 1, the positions corresponding to the first port 11 and the third port 13 of the female connector 3, and, further upward, the positions corresponding to the edge pins of the first port 11 and the third port 13 of the male connector 2.

As shown in FIG. 1 and FIG. 3, the male connector 2 is positioned so that the front face 2a of the connector will be at the same level as the outer surface of the front wall 52a of the case body 52, and so that the upper opening surface 2b of the male connector 2 is located so as to protrude from the opening at the top of the front wall 52a of the case body 52 and so as to remain midway in terms of the thickness of the cover 51 without protruding from the outside surface (top surface) of the cover 51 when the cover 51 is closed.

Therefore, openings 7 and 8 that are capable of accommodating a male connector 2 are provided at the forward end of the cover 51 and at the upper end of the front wall 52a of the case body 52, respectively, with the opening 8 forming the upper-edge line of the front (forward) side of the HDD case 100.

Moreover, a recessed male-connector mating surface 51*b* that connects with the opening 7 of the cover 51 and overlaps the latter half of the upper opening surface 2*b* of the male connector 2 is formed, being cut to have a thickness that is approximately one-half of that of the cover 51.

Accordingly, because the first half of the upper opening surface 2*b* of the male connector 2 is exposed, together with the edge pin 9, to the outside upwardly, the male connector 2 can be confirmed visually diagonally from the upper-rear side, which facilitates both (1) fitting the male connector 2 with the female connector to which it is to be externally connected, and (2) cleaning of the edge pin 9.

Thus, the cover 51, which is provided with a male-connector mating surface 51*b* that is connected via the opening 7, allows the waterproof seal 57 to be applied all along the case-body mating surface 51*a* mating with the open top including the upper end surface of walls 52*a*, 52*c*, and 52*c* of the case body 52, the top surface of the flange 52*d*, and the top surface of the sound-absorbing material 53*b*, and to the male-connector mating surface 51*b* that mates with the upper opening surface 2*b* of the male connector, which ensures waterproofness so as to prevent moisture from intruding into the HDD case if, for example, water is sprayed in the event of a fire.

The seal 57 is thin, for example, around 1 mm thick, and it is appropriate in regard to resiliency, and waterproofness, such as is characteristic of rubber or certain types of plastic, and said seal is applied to the back side (inner surface) of the cover 51. As shown in FIG. 1 and FIG. 5, the inner portion of the seal is cut so as to have a rectangular shape, and said inner portion is removed by, for example, being punched out so as to correspond to the surface mating with the open top of the case body 52, including the upper end surface of walls 52*a*, 52*c*, and 52*c*, the top surface of the flange 52*d*, and the top surface of the sound-absorbing material 53*b*, and the upper opening surface 2*b* of the male connector, and therefore the contour of the seal is approximately the same as the rectangular frame of the cover 51.

This seal 57 consists of the case-body seal 57*a*, which corresponds to the mating surfaces (including the upper-end surfaces of the walls 52*a*, 52*b*, and 52*c* of the case body 52, the top surface of the flange 52*d*, and the upper-end surface of the sound-absorbing material 53*b*), and he male-connector seal 57*b*, which corresponds to the surface mating of the upper opening surface 2*b* of the male connector 2.

Accordingly, the case-body seal 57*a* is applied to the case-body mating surface 51*a*, and the male-connector seal 57*b* is applied to the male-connector mating surface 51*b*, which constitute the seal 57 to be formed as an entire integral endless frame.

Because the male-connector mating surface 51*b* is cut to have a thickness that is approximately one-half of that of the cover 51, forming a recess that is, for example, approximately one-half of the thickness of the cover 51, the male-connector seal 57*b* applied to the male-connector mating surface 51*b* is transformed into a recessed shape against the case-body seal 57*a*, as shown in FIG. 1 and FIG. 5.

Due to the resiliency of the seal 57, the boundary between the male-connector seal 57*b* and the case-body seal 57*a* can be transformed so as to form a recess, and the addition of shallow notches to said boundary facilitates the transforming of the male-connector seal 57*b* into a recess, and the notches are also sufficiently sealed and adhered to each other due to the resiliency of the seal 57, which secures waterproofness.

Thus, applying the waterproof seal 57 all along the mating surface of the cover 51 with the open top of the case body 52 and the upper opening 2*a* of the male connector 2 secures good waterproofness of the inside of the HDD case 100.

As shown in FIG. 3, the total of the depth d of the opening 8 at the front wall 52*a*, the thickness t of the case-body mating surface 51*a*, and the mounting thickness t2 of the case-body seal 57*a* of the seal 57 equals the total of the height h of the male connector 2, the thickness t1 of the male-connector mating surface 51*b*, and the mounting thickness t2 of the male-connector seal 57*b*.

Accordingly, the depth d of the opening 8 can be determined if there are provided the height h of the male connector 2, the thickness t of the case-body mating surface 51*a*, and the thickness t1 of the male-connector mating surface 51*b*.

Thus, as mentioned above, if the male connector 2 is located at the opening 8, the male connector 2 is mounted so that the upper opening surface 2*b* of the male connector 2 slightly protrudes from the opening at the top of the front wall 52*a* of the case body 52 and remains midway in terms of the thickness of the cover 51 without protruding past the outside surface (top surface) of the cover 51 when the cover 51 is closed.

The seal 57 is a circular or polygon ring cross-section seal instead of the above-mentioned thin seal, and is made of rubber or one of certain types of plastic (in this case, to deal with the increased labor for processing, it is desirable for the seal groove to be ditched on the aforementioned mating surfaces 51*a* and 51*b* of the cover 51). Or one of a variety of seals that utilize a hot-melt adhesive or the like can be used.

Moreover, the seal 57 can be applied to the above-mentioned mating surfaces 51*a* and 51*b* of the cover 51 by using any of a variety of adhesives, including hot-melt adhesives, pressure-sensitive adhesives, or two-side-adhesive-coated tapes.

Further, to achieve waterproofness, the endless seal 57 is applied to (1) the cover 51, (2) the spaces at the four corners where the sides 52*a*, 52*b*, 52*c*, and 52*c* of the case body 52 meet, (3) the circumference of the housing of the male connector 2 at the front wall 52*a*, and (4) the opening 8, and, in addition, the tapped holes on the outside of the case body 52 or the screws put into said tapped holes are completely sealed by applying a liquid calking compound or other sealant, a hot-melt adhesive, or other comparable material that hardens after being applied.

Thus, the waterproofness of said HDD case 100 is completely achieved.

The inside dimensions of the HDD case 100 can be such that said HDD case 100 can house either a 3.5-inch HDD, which is 101.6 mm in width, 25.4 mm in height, and 146 mm in length, or a 2.5-inch HDD, which is 70 mm in width, 9.5 mm in height, and 100 mm in length.

That is to say, the inside dimensions of a HDD case for housing a 2.5-inch HDD are larger than the outside dimensions of a 3.5-inch HDD. This allows the 2.5-inch HDD that has the above-mentioned capabilities regarding vibration absorption, sound isolation, heat radiation, and waterproofness to be mounted in the 3.5-inch bay of a personal computer.

Moreover, the inside dimensions of the case body can be such that it can house not just 2.5-inch or 3-inch HDDs, but HDDs of different sizes, including 5-inch HDDs. This allows an HDD case that houses a 2.5-inch or 3.5-inch HDD to be mounted on a multiple-HDD storage device that accommodates trays that allow each HDD to be removed, which increases convenience. Thus, the tray can be changed to one that is superior in regard to sound insulation, heat radiation, and waterproofness.

Embodiment 2

FIG. 6 is a perspective view of the case base seen from the bottom of the case body of Embodiment 2 of the present invention (the front and back walls are not shown).

For better understanding, any part of Embodiment 2 that has the same function as in Embodiment 1 is designated by the same reference number as for Embodiment 1.

Embodiment 2 includes a case base 52g on which a plural of fins 52f are formed at the bottom 52e and along the outside of the right and left walls 52c and 52c of the case body 52. The front and back walls (not shown) of the case base 52g are attached by screws to the front and back ends of the case base 52g.

The fins 52f are formed on the bottom 52e and on the outside of the right and left walls 52c and 52c, along with a plurality of parallel grooves in the lengthwise direction of the case base 52g.

In this embodiment, the grooves are provided in the lengthwise direction on the bottom 52e and on the outside of the right and left walls 52c and 52c, but constitutions with grooves only on the outside of the bottom 52e or only on the outside of the right and left walls 52c and 52c are also possible. Furthermore, the grooves can instead be provided in the widthwise direction. In addition, grid-pattern fins can be included by providing grooves in both the lengthwise and widthwise directions.

Moreover, fins can be formed on the outside of the front and back walls and on the cover.

The other features of Embodiment 2 are the same as those of Embodiment 1.

Accordingly, in Embodiment 2, in addition to having the advantages of Embodiment 1, the heat radiation of the HDD is further increased by adding the fins and grooves on the outside of the case body and/or the cover.

Also in this Embodiment, the outer surfaces of the case body and the cover are treated with black alumite, which further increases the heat radiation.

Meanwhile, the constitution of the HDD case of the present invention can be readily changed by modifying the shape of the case body and/or of the cover, the materials of which the parts are made, and so on, other than is shown for Embodiment 1 in FIGS. 1-6. For example, the fins can have any cross-sectional shape instead of the rectangular shape of this embodiment.

What is claimed is:

1. A rectangular box-like metal case with a hard-disk drive (hereinafter "HDD" case) wherein said hard-disk-drive case comprises:
    a rectangular box-like case body having a bottom and an open top, comprising,
        a heat sink at the center of the inner surface of the bottom, being mounted via an adhesive synthetic-resin mat, and
        sound-absorbing materials on the inner surfaces of the case's walls so as to surround said heat sink;
    a cover that fits the open top of said case body, comprising,
        a heat sink at the center of the inner surface of said cover being mounted via an adhesive synthetic-resin mat, and
        sound-absorbing materials that surround said heat sink of said cover;
    a relay board on the inside of the front wall of said case body, comprising,
        an internal connector that fits an interface connector on the housed HDD,
        a relay-board external connector that is exposed at an open top of the front of said case body and that faces the outside, and that is positioned such that the top surface of said connector will not protrude beyond the outside surface of the cover when said cover is closed, and
        wiring pattern that connects said external connector with said internal connector; and
    a waterproof seal that is applied along the entirety of the mating surface between said cover and the open top of the case body, and between said cover and the upper opening of said external connector.

2. The HDD case according to the claim 1, wherein
    there are provided at the forward end of said cover and at the upper end of the front of said case body openings that can accommodate said relay-board external connector and that form the edge of the upper-front end of the HDD case;
    the front of said external connector is at the same level as the edge of the upper-front end of the HDD case;
    the upper opening of said external connector protrudes from the open top of the front wall of said case body but does not extend outwardly beyond the middle of the thickness of the cover and thus does not protrude beyond the outside surface of the cover when the cover is closed; and
    said seal is applied along the entirety of the mating surface between said cover and the opening at the top of the case body and between said cover and the upper end of said external connector.

3. The HDD case according to the claim 1, wherein
    said adhesive synthetic-resin mat is high in regard to both thermal conductivity and cushioning characteristics and is interposed between the bottom of said case body and said heat sink and between the cover and said heat sink on the cover, and
    both of said heat sinks contact said hard-disk drive.

4. The HDD case according to the claim 1, wherein the inside dimensions of said case body are such that said case body can house HDDs of different sizes.

5. The HDD case according to the claim 1, wherein to achieve waterproofness a liquid calking compound, sealing material, or hot-melt adhesive that hardens after application is applied so as to completely seal (1) the spaces at the four corners where the sides of said case body meet, (2) the circumference of the housing of said external connector at the side of said case body, and (3) the screws that are externally mounted to said case body.

* * * * *